United States Patent Office 3,667,713
Patented June 6, 1972

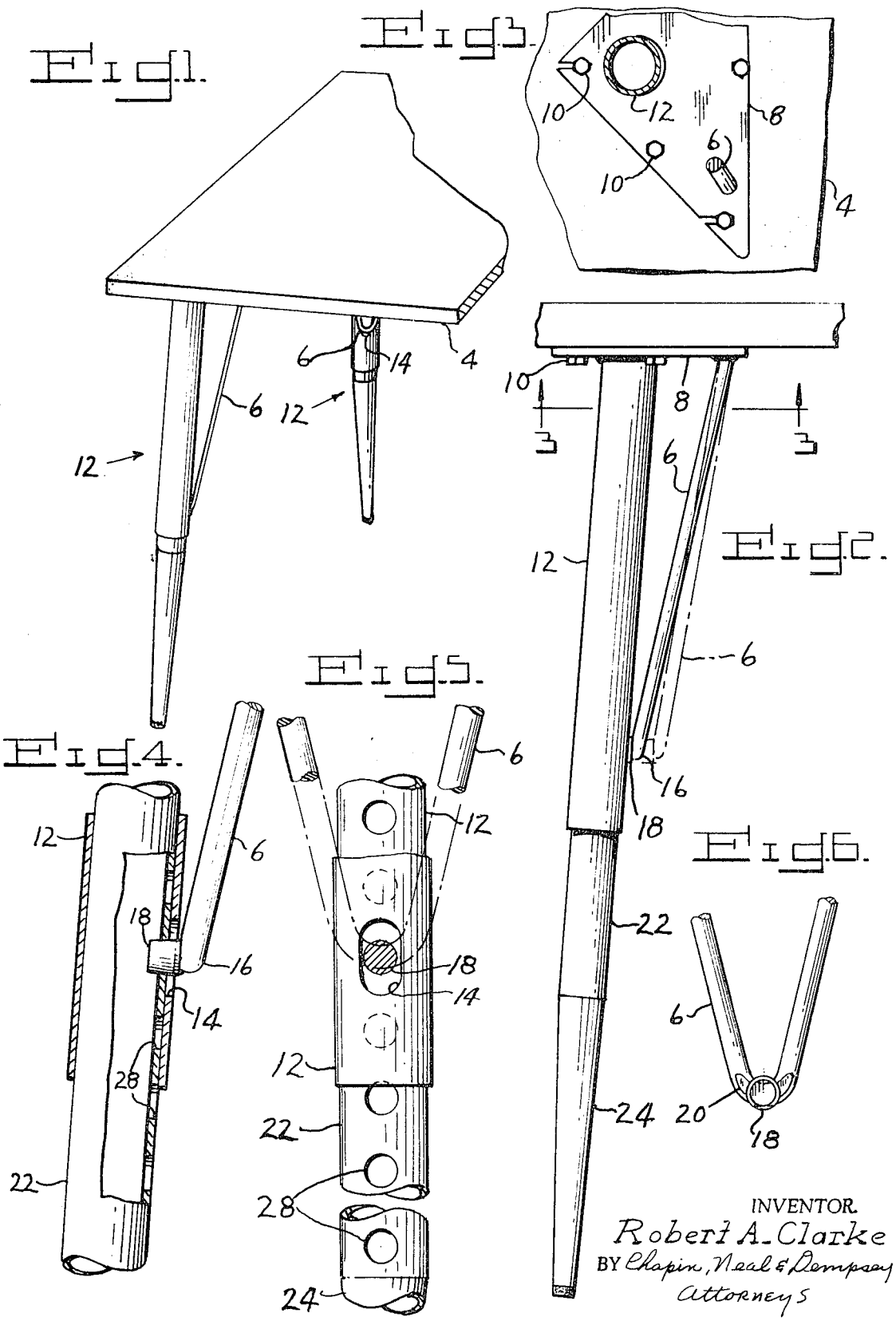

3,667,713
ADJUSTABLE TABLE LEG
Robert A. Clarke, Blanford, Mass., assignor to The
Columbia Manufacturing Co., Inc., Westfield, Mass.
Filed Feb. 8, 1971, Ser. No. 113,432
Int. Cl. F16m 11/26
U.S. Cl. 248—188.5                         2 Claims

ABSTRACT OF THE DISCLOSURE

Adjustable table leg assembly having a mounting plate and depending therefrom a fixed tubular sleeve provided with a slot spaced from the lower open end thereof and a V-shaped rod brace member of spring metal having its outer ends fixed to the plate with the lower looped end spring tensioned against the sleeve at said slot. A tapered stud is fixed on the looped end of the brace and projects through said slot. An adjustable tubular lower leg section is slidably inserted in the sleeve and has a series of longitudinally spaced holes releasably engageable by the tapered stud to secure said leg section by the brace member at a selected position of telescopic extension.

BACKGROUND

This invention relates to table leg constructions for adjusting the height of a table and, in particular, to a leg assembly especially adapted for school work tables where the need frequently exists for changing the height of the working surfaces so that they may readily be used in any one of a number of classrooms of the various grade levels, or otherwise be adjusted for children of different age groups. Thus, inventory problems related to the varying individual classroom requirements are avoided.

The closest known prior art consists of a unit in which a lower leg section is slidably inserted in an upper fixed sleeve section and held therein at various positions of adjustment by a set screw threaded in the end of a metal reinforcing brace member fixed to the sleeve adjacent its lower end. The set screw projects through the sleeve wall to be seated in one of a series of longitudinally spaced dimpled recesses formed in the outer wall surface of the telescopically inserted lower leg section. This prior construction requires a screw driver tool to disengage and re-engage the set screws when making adjustments. Inadvertent mis-alignment in seating the set screw in a recess is also possible. Furthermore, the threaded connections may fail to hold securely under hard usage and result in instability unless extreme care is taken in making adjustments.

It is a principal object of this invention to eliminate the need for handling any tools in order to adjust the height of a table and to provide an assembly in which adjustments can be made entirely by hand. A correct positional alignment of the mating parts is accomplished by a self-centering action, and a positive locking fit is obtained without risk of human error. The new construction incorporates, in a reinforcement member or leg brace, a spring tensioned means for anchoring a telescopically slidable lower leg portion in place while substantially preserving its function as a leg brace.

SUMMARY OF THE INVENTION

Briefly, the invention in its preferred form includes a fixed upper sleeve tube having a slot cut in the wall upwardly of the lower end and a V-shaped hairpin spring steel rod having its legs mounted to spring tension its lower looped end against the sleeve in registering relation with the slot. A tapered stud is fixed on the looped end to project through the slot. A lower telescope tube is slidably inserted in the sleeve and has a series of longitudinally spaced holes registrable with the slot of the sleeve to receive the tapered stud and be held thereby in a selected position of extension. The stud is fully seated in an opening of the slidable tube adjacent the larger end of the taper and remains under spring tension in this condition. The stud is removed from the sleeve interior and the extension of the telescoping tube changed by manually drawing the hairpin rod back away from the sleeve, shifting the slidable tube, and re-engaging the stud in a different opening. In fully seated condition the stud is positively anchored in an opening and the V-shaped spring rod acts substantially as a conventional reinforcing leg brace member.

FIGURES

FIG. 1 is a perspective view of one end of a table showing a pair of adjustable legs of the present invention in mounted position;

FIG. 2 is a side elevational view of one of the legs seen in FIG. 1;

FIG. 3 is a plan view of a leg mounting plate as on line 3—3 of FIG. 2;

FIG. 4 is a partial longitudinal section of the leg assembly showing the telescopic relation of the upper and lower leg sections and releasable stud securing means;

FIG. 5 is a partial plan view of the leg assembly as seen from the right side of FIG. 4; and FIG. 6 is a fragmentary view showing a detail of the stud mounting.

DESCRIPTION

In the drawings a pair of adjustable legs 2 (FIG. 1) are shown mounted on and supporting a typical school table top 4 as at one end or along one side thereof, the legs being outwardly angled in a conventional manner with bracing reinforcement members at 6. As shown (FIGS. 2 and 3) a triangular mounting plate 8 is secured by screw bolts at 10 to the underside of a table as at the corners thereof. Rigidly fixed to the plate as by brazing or welding is a depending upper leg section 12 in the form of a tubular sleeve. The sleeve in its lower portion is provided with a slot 14 through the wall thereof upwardly of the lower open end. Also suitably fixed to the plate are the upper ends of the reinforcing brace member 6 which is in the form of a V-shaped spring metal rod. The fixed ends of the brace 6 are spaced from the sleeve 12 and the arms are angularly directed towards the sleeve so that the lower looped end 16 of the brace is spring tensioned thereagainst in overlying relation centrally of slot 14 (FIGS. 4, 5).

At this lower looped end or apex of the V a stud 18 is fixed to project through slot 14 and into the interior of the sleeve. The stud is mounted on the brace as by silver soldering or brazing and to insure a secure bonding and assist the correct positioning of the stud the inner face at the looped end of the rod is flattened as indicated at 20. The stud as best indicated by FIG. 4 is of a cylindrically tapered formation to assist in seating the same as will be described.

An adjustable lower leg portion as the telescope tube member 22 is inserted in the open end of the sleeve with a sliding fit. The tube 22 is of uniform diameter throughout its upper portion and nests snugly in the sleeve at all positions of height adjustment, the lower portion being tapered at 24 to enhance the appearance and a pad 26 being fitted at the bottom. In the upper tube portion a series of longitudinally spaced circular openings or holes 28 are cut through the wall to receive stud 18 at a selected position of telescopic extension from the sleeve.

As best shown by FIGS. 4, 5 the stud seated in one of the openings holds the selected position of adjustment by locking the tube 24 aaginst endwise movement in the sleeve. The stud may be removed by manually flexing the brace rod 6 away from the sleeve as indicated by the phantom line position of FIG. 2, whereupon the telescope tube 24 may be shifted longitudinally and a desired height adjustment made.

As will be seen from FIG. 5 the slot 14 of the sleeve is elongated. In making an adjustment the slot thus provides an opening for visually assisting the operation of re-engaging the stud in another hole 28 in the tube 24. The operator need not then rely entirely on "feel" for stud engagement. It will also be noted that the tapered nose of the stud will enable the operator to shift the tube 24 into approximate registration with the stud and release the latter for snapping into the hole and "finding" its fully seated condition as an automatic final step.

As previously mentioned the brace member 6 is under spring tension in the mounted condition and thus stresses the lower looped end in the direction of the sleeve when the stud is engaged in an opening 28. As indicated by FIG. 4 the fully seated condition is with the edges of the opening remaining on the stud taper. A secure wedging action and "locking" fit thus results to insure a sturdy and rugged connection preventing endwise movement. In the drawings (FIGS. 2 and 4) the spacing between the looped end of the rod 6 and edges of the slot 14 of sleeve 12 is exaggerated for purposes of illustration and to indicate that the stud is seated prior to any possible contact of the rod 6 against the surface of sleeve 12. In the actual structure such separation is intended to be barely visible to an observer's eye and to preserve the function of the rod as a reinforcing brace for the leg. In the latter respect it will be noted that the arms of rod 6 act as supporting struts substantially resisting most forces exerted against the leg except in the direction of direct withdrawal of the stud from an opening 28 of the tube 24. Accordingly, the rod 6 continues to act as a reinforcing brace member.

What is claimed is:

1. Adjustable table leg construction comprising
 a table platform mounting plate,
 a fixed tubular sleeve depending from the plate provided with a longitudinal slot spaced upwardly of the lower end thereof,
 a V-shaped spring metal brace member having the ends of its arms fixed to the plate in spaced relation to the sleeve and its lower end spring tensioned against said sleeve in registration with said slot,
 a tapered stud on said lower end projecting through the slot into the sleeve interior and removable therefrom by flexing the brace member, and
 a lower tubular leg portion slidably received in the sleeve having a series of longitudinally spaced openings in the wall thereof engageable with the stud, and in fully seated condition of the stud embracing the tapered portion thereof for anchoring the leg at a selected position of extension from the sleeve, said brace member in said seated condition remaining under tension in reinforcing relationship to said sleeve and lower leg portion.

2. The structure as set forth in claim 1 in which said brace member is a spring steel rod bent into V-shape and said stud is brazed on a flatted portion at the looped end thereof.

References Cited

UNITED STATES PATENTS

| | | | |
|---|---|---|---|
| 546,614 | 9/1895 | Gschwend | 248—409 X |
| 1,453,650 | 5/1923 | Willson | 248—408 |
| 2,932,481 | 4/1960 | Breer et al. | 248—408 X |

WILLIAM H. SCHULTZ, Primary Examiner

U.S. Cl. X.R.

248—423